(12) United States Patent
Baker

(10) Patent No.: US 6,268,988 B1
(45) Date of Patent: Jul. 31, 2001

(54) GROUND FAULT DETECTOR FOR GAS DISCHARGE TUBING

(75) Inventor: Buddy A. T. Baker, Pointe-Claire (CA)

(73) Assignee: Neonics Technology Inc., Pointe-Claire (CA)

( * ) Notice: Subject to any disclaimer, the term of this patent is extended or adjusted under 35 U.S.C. 154(b) by 0 days.

(21) Appl. No.: 09/405,096

(22) Filed: Sep. 27, 1999

Related U.S. Application Data

(63) Continuation-in-part of application No. 08/902,299, filed on Jul. 29, 1997, now Pat. No. 5,978,190.

(30) Foreign Application Priority Data

Dec. 24, 1996 (CA) ................................................. 2193909

(51) Int. Cl.[7] ................................................. H02H 3/00
(52) U.S. Cl. ........................... 361/42; 361/93.7; 361/50; 361/86
(58) Field of Search .................. 361/42, 49, 50, 361/78, 86, 93.1, 93.7

(56) References Cited

U.S. PATENT DOCUMENTS 4,994,933 * 2/1991 Matsuoka ............................... 361/42

* cited by examiner

*Primary Examiner*—Michael J. Sherry
(74) *Attorney, Agent, or Firm*—Harold C. Baker; Robert A. Wilkes; Robert G. Hendry

(57) ABSTRACT

A method of detecting absence of connection of an external ground to a ground connection point associated with an AC supply circuit of a power supply. The AC supply circuit has hot and neutral conductors, with the neutral conductor externally connected to ground. The math involves (a) passing a current from the hot conductor to the neutral conductor via the ground connection point, (b) detecting passage of the current, (c) shutting down operation of the power supply upon detection of the current, and (d) bypassing at least an effective portion of the current from the ground connection point to external ground on connection of the ground connection point to external ground, thereby disabling the detection of passage of the current.

19 Claims, 2 Drawing Sheets

GROUND FAULT DETECTOR FOR GAS DISCHARGE TUBING

This application is a continuation-in-part of U.S. application Ser. No. 08/902,299 filed Jul. 29, 1997, now U.S. Pat. No. 5,978,190.

FIELD OF THE INVENTION

This invention relates to the field of ground fault detectors, and particularly ground fault detectors used in high voltage circuits.

BACKGROUND TO THE INVENTION

Ground fault detectors are used in high voltage circuits such as in ballasts which drive gas discharge tubes such as neon display tubes. A ground fault detector is used to safeguard current carrying circuits, detecting leakage current to ground and shutting off the power supply of the ballast in the event the leakage current exceeds a predetermined value. Excessive leakage current can cause arcing, which can cause fire or can be lethal, and therefore maximum leakage is regulated by standards.

One of the conventional ways of controlling the shut-off of the high voltage is to monitor the alternating current which is returned to ground carried by the center tap of the high voltage secondary winding of a high voltage transformer. In the event the high voltage leads of the secondary winding are conducting to ground, causing current to flow from the center tap to ground, a current transformer reflects this back to a shutdown circuit. Examples of circuits which use this principle are described in U.S. Pat. No. 4,663,571 to Nilssen and U.S. Pat. Nos. 4,613,934 and 5,089,572 to Pacholok.

Another conventional way of controlling shut-down of a high voltage circuit is to detect the inherent phase shift between current and voltage when the high voltage is radiated capacitively to ground. However, the realized circuit requires a phase discriminator circuit and a high parts count, which is costly.

A typical ground fault detector is comprised of a solid state switch which accepts a trigger voltage and conducts to operate a relay, etc. when the trigger voltage is exceeded. The relay operates switch contacts in the power supply, shutting down the power supply. The trigger voltage is derived by detecting the leakage current and converting this current to a voltage which is rectified and is applied to the solid state switch, which will operate if the voltage, and thus the current, is large enough. Ground fault detector circuits of this type are described, for example, in U.S. Pat. No. 4,114,089 to Ahmed, U.S. Pat. No. 3,899,717 to Legatti et al and U.S. Pat. No. 4,138,707 to Gross.

The leakage current detected in the aforenoted structures constitutes radiated or reactive alternating current, similar to current emitted from a radio frequency transmitter. The return energy is purely capacitive to ground. If the energy emitted by both high voltage leads (e.g. the antennae) of the secondary winding of the high voltage transformer of the ballast is not balanced capacitively, a current will flow through the center tap of the secondary winding to ground, creating an A.C. voltage which is detected as leakage current, and causing a false shutdown of the power supply.

It has been determined that hazardous arcing to ground can be detected solely from the D.C. current flowing from a D.C. biased winding to ground, rather than from the A.C. reactive current to ground. The systems described above shut down in the presence of A.C. reactive current, even without the presence of additional resistive current, which causes the false shutdown. The prior art systems are thus not reliable detectors of the hazardous currents.

SUMMARY OF THE INVENTION

The present invention is a ground fault detector circuit which ignores the A.C. leakage current caused by radiation, unbalanced radiation current, etc., and provides a trigger voltage which is caused by true direct current leakage during dielectric breakdown. It generates the trigger voltage by short circuiting A.C. leakage current, and detects only D.C. (resistive path) leakage current, applying a voltage derived from the D.C. leakage current to the trigger input of a solid state switching device such as a programmable shunt regulator.

The present invention thus provides reliable detection and high voltage shut down for D.C. leakage current which would otherwise be hazardous, ignoring A.C. radiated current.

In accordance with an embodiment of the invention, a method of shutting down a power supply which drives a transformer having a center-tapped high voltage secondary winding, comprises short circuiting A.C. leakage current that may flow between the secondary winding and ground, detecting D.C. voltage caused by D.C. leakage current which may be conducted between the D.C. biased secondary winding and ground, applying the D.C. voltage to the control input of a switch, and controlling shut-down of the power supply by means of the switch.

In accordance with another embodiment, a ground fault circuit comprises (a) a power supply, and a transformer having a primary winding driven by the power supply and a high voltage secondary winding, (b) a shutdown control circuit having a controllable switch and a control input coupled to the controllable switch for causing operation of the controllable switch when a trigger voltage applied to the control input is exceeded, the shutdown control circuit being coupled to the power supply for controlling shut-down of the power supply when the switch is in operation, (c) a circuit connected to the high voltage secondary winding for detecting leakage current from the D.C. biased transformer to ground, for short circuiting an A.C. component of the leakage current passing through the detector to ground, and for deriving a D.C. voltage from D.C. leakage current from the transformer to ground, and (d) a circuit for applying the derived D.C. voltage to the control input of the shutdown control circuit, whereby the power supply may be shut down in the presence of leakage current in excess of the trigger voltage which is derived exclusively from D.C. current leakage from the transformer to ground.

BRIEF INTRODUCTION TO THE DRAWINGS

A better understanding of the invention will be obtained from an understanding of the detailed description below, with reference to the following drawing, in which.

DETAILED DESCRIPTION OF PREFERRED EMBODIMENT

Figure 1:
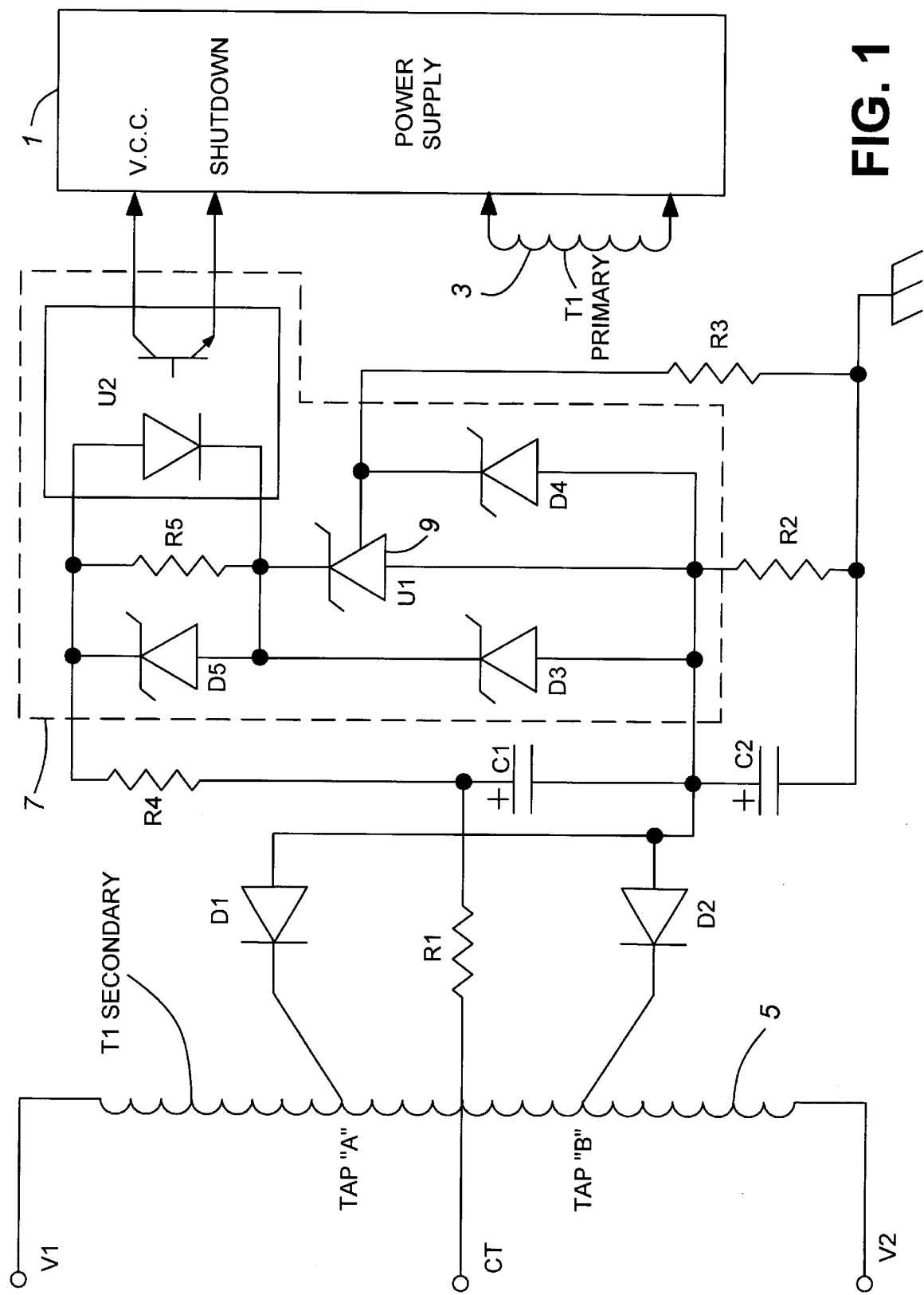
FIG. 1 is a schematic drawing of a preferred embodiment of the invention.

A power supply 1, for example one which drives a neon gas discharge tube, has a shutdown control input which, when driven by a voltage VCC, shuts down the power supply in a conventional manner. A loosely coupled transformer is comprised of a primary winding 3 which is driven by the power supply, and a high voltage secondary winding 5. Ends V1 and V2 of the secondary winding are to be connected to a gas discharge tube.

The secondary winding has a center tap CT, and a balanced pair of taps A and B on either side of the center tap for obtaining a small representative portion of the high voltage produced by the secondary winding. A pair of diodes D1 and D2 having their cathodes connected to the respective taps, have their anodes connected together and to the negative terminal of a capacitor C1. The positive terminal of capacitor C1 is connected via resistor RI to the center tap of secondary winding 5.

The diodes rectify the small portion of the high voltage, resulting in a D.C. voltage across capacitor C1 which has been charged through resistor R1. This D.C. voltage creates a D.C. bias of the center tap with respect to the potential at the negative terminal of capacitor C1. In a successful embodiment, the D.C. voltage across capacitor C1 was 25 volts.

Capacitor C2 and resistor R2 are connected in parallel between the negative terminal of capacitor C1 and ground. This provides an A.C. shunt path to ground, to maintain a low A.C. voltage from the center tap CT of the secondary winding 5 to ground, via the path R1, C1, C2 and R2.

If there is A.C. radiated leakage current between the secondary winding 5 and ground, this current is short circuited by capacitor C2.

If there is no D.C. leakage current from the D.C. biased transformer secondary winding to ground (e.g. caused by dielectric breakdown), there will be no net D.C. voltage across capacitor C2. Thus the D.C. potential at the negative terminal of capacitor C1 will be the same as that at the positive terminal of capacitor C2, i.e. ground potential.

However, if there is D.C. leakage to ground, capacitor C2 will begin to charge. The voltage will appear across resistor R2, which is applied to the control input of a shutdown control circuit 7. The value of resistor R2 should be chosen to trigger control circuit 7 if a predetermined D.C. leakage current level is reached.

The shutdown control circuit 7 is preferably comprised of a programmable shunt regulator U1, which has a switch control input 9. The shunt regulator is functionally similar to an NPN bipolar transistor in operation, except that the threshold voltage to turn it on (into a conducting state from anode to cathode) is about 2.5 volts.

The cathode of shunt regulator U1 is connected to one terminal of the photodiode (e.g. light emitting diode) of an optocoupler U2, the other terminal of which is connected via a current limiting resistor R4 to the positive terminal of capacitor C1. The anode of shunt regulator U1 is connected to the junction of the negative terminals of capacitors C1 and C2 and the anodes of diodes D1 and D2.

Resistor R3 is connected between the control terminal of shunt regulator U1 and ground. Thus the voltage across resistor R2 is applied between the control input of shunt regulator U1 through resistor R3 and the anode of shunt regulator U1.

In operation, when the D.C. voltage caused by D.C. leakage to ground from the D.C. biased secondary winding 5 of transformer T1 is equal to or is in excess of the turn-on voltage of shunt regulator U1, e.g. 2.5 volts or higher, shunt regulator U1 is triggered, and it becomes conductive between its cathode and anode. Current resulting from the rectified voltage which appears across capacitor C1 from transformer T1, passes through the photodiode of optocoupler U2 and shunt regulator U1, causing the phototransistor in the optocoupler which is connected between the VCC and the shutdown terminals of the power supply 1 to conduct, causing the power supply to shut down. The power supply is thereby triggered to shut down.

In addition, it is preferred to connect resistor R5 across the light emitting diode of optocoupler U2, to prevent the optocoupler from turning on as a result of anode to cathode leakage current of the shunt regulator. A diode D5 is also preferred to be connected across the photodiode of the optocoupler U2 in oppositely poled direction to the light emitting diode, to prevent damage to the photodiode from reverse voltage spikes. A diode D4 is connected between the control input and the anode of the shunt regulator U1, with its anode connected to the anode of the shunt regulator, to protect the shunt regulator from reverse voltage spikes.

A diode D3 is preferably connected across the shunt regulator U1 in the same polarity direction, as a limiting shunt to protect the shunt regulator from damage in case the secondary winding voltage goes to high, and to protect the shunt regulator from reverse voltage spikes. If diode D3 is caused to conduct from one of these two events, it will cause the optocoupler to operate, and will thereby trigger the power supply and therefore the inverter to shut down as if the shunt regulator had turned on from D.C. ground fault current. Thus the inverter is provided with monitoring of excessive voltage in the high voltage secondary winding 5.

High voltage circuits such as ballasts which drive gas discharge tubes such as neon tubes are driven by power supplies which are connected to so-called hot, neutral and ground A.C. input supply conductors, such as supplied by the 120 volt mains. 120 volts is applied between the hot and neutral supply conductors. The neutral conductor is connected to ground at an external location. The external ground conductor is connected to a ground connection point such as to a frame or chassis of the shut-down circuit for carrying fault or leakage current to ground, for safety reasons.

It has been found that in some cases the external ground connector breaks, is cut, its connection to the frame or chassis is intermittent, an installer may forget to connect it to the frame or chassis, etc. In the case of a fault, the frame or chassis can acquire a voltage above ground, presenting a hazard to a worker or others who may come into contact with it. For that reason it is important that the absence of connection of an external ground to the ground connection point should be detected and the power supply shut down.

Further, certain faults can cause the voltage between the neutral conductor and the ground connection point to become excessive, for example if the external neutral wire touches another hot wire in another circuit which is out of phase with the first hot wire. In this case as well, the voltage on the frame or chassis with respect to ground can become hazardous.

The present embodiments detect such excessive voltage between the neutral conductor and ground and detects the absence of a ground connection to the ground connection point, and in either case, causes the power supply to shut down. Shutting down the power supply eliminates the hazardous high voltage generated by the power supply, thereby protecting a worker or other person who may come into contact with the frame or chassis.

In accordance with an embodiment of the invention, a method of detecting absence of connection of an external ground to a ground connection point associated with an AC supply circuit of a power supply, wherein the AC supply circuit has hot and neutral conductors, and wherein the neutral conductor is externally connected to ground, comprises:

(a) passing a current from the hot conductor to the neutral conductor via the ground connection point, (b) detecting passage of the current, and (c) shutting down operation of the power supply upon detection of the current.

In accordance with another embodiment, the method includes detecting at least a fraction of an excessive voltage difference between the ground connection point and the neutral conductor comprising passing current caused by the excessive voltage between the ground connection point and the neutral conductor through an impedance, detecting voltage appearing across at least part of the impedance resulting from the excessive voltage, and shutting down operation of the power supply as a result of detecting the voltage.

In accordance with another embodiment, an interrupt circuit for a power supply having neutral and hot input supply conductors, comprises:

(a) a first impedance connected between the neutral conductor and a ground connection point, (b) a second impedance connected between the hot conductor and the ground connection point, (c) a circuit for connecting an external ground conductor to the ground connection point, (d) a rectification circuit connected across at least part of the first impedance, and (e) a power supply shut-off circuit for receiving a rectified voltage provided by the rectification circuit in the presence of a predetermined current carried by the first impedance, and for shutting down operation of the power supply in response thereto.

In accordance with another embodiment, an interrupt circuit for a power supply having neutral and hot input supply conductors, comprises:

(a) a first impedance connected between the neutral conductor and a ground connection point, (b) a second impedance connected between the hot conductor and the ground connection point, (c) a circuit for connecting an external ground conductor to the ground connection point, (d) a circuit for detecting a predetermined voltage across at least part of the first impedance, and for generating a control voltage in response thereto, and (e) a power supply shut-off circuit for receiving a control signal provided by the detection circuit, and for shutting down operation of the power supply in response thereto.

In accordance with another embodiment, an interrupt circuit for a power supply having neutral and hot input supply conductors, comprises:

(a) a power supply, and a transformer having a primary winding driven by the power supply and having a high voltage secondary winding, (b) a shutdown control circuit having a controllable switch and a control input coupled to the controllable switch for causing operation of the controllable switch when a trigger voltage applied to the control input is exceeded, the shutdown control circuit being coupled to the power supply for controlling shut-down of the power supply when the switch is in operation, (c) a circuit connected to the high voltage secondary winding for detecting leakage current from the transformer to ground, for short circuiting an AC component of the leakage current passing through the detector to ground, and for deriving a DC voltage from DC leakage current from the transformer to ground, (d) a circuit for applying the derived DC voltage to the control input of the shutdown control circuit, (e) a first impedance connected between the neutral conductor and a ground connection point, (f) a second impedance connected between the hot conductor and the ground connection point, (g) a circuit for connecting an external ground conductor to the ground connection point, (h) a rectification circuit connected across at least part of the first impedance, and (i) a circuit for applying the rectified voltage provided by the rectification circuit in the presence of a predetermined current carried by the first impedance to the control input of the shutdown control circuit, whereby the power supply may be shut down in the presence of at least one of (i) leakage current in excess of the trigger voltage which is derived from the DC current leakage from the transformer to ground, (ii) current passing through the first impedance caused by the absence of an external ground connection to the ground connection point, and (iii) current passing through the first impedance caused by an excessive voltage between the neutral conductor and ground connection point.

Figure 2:
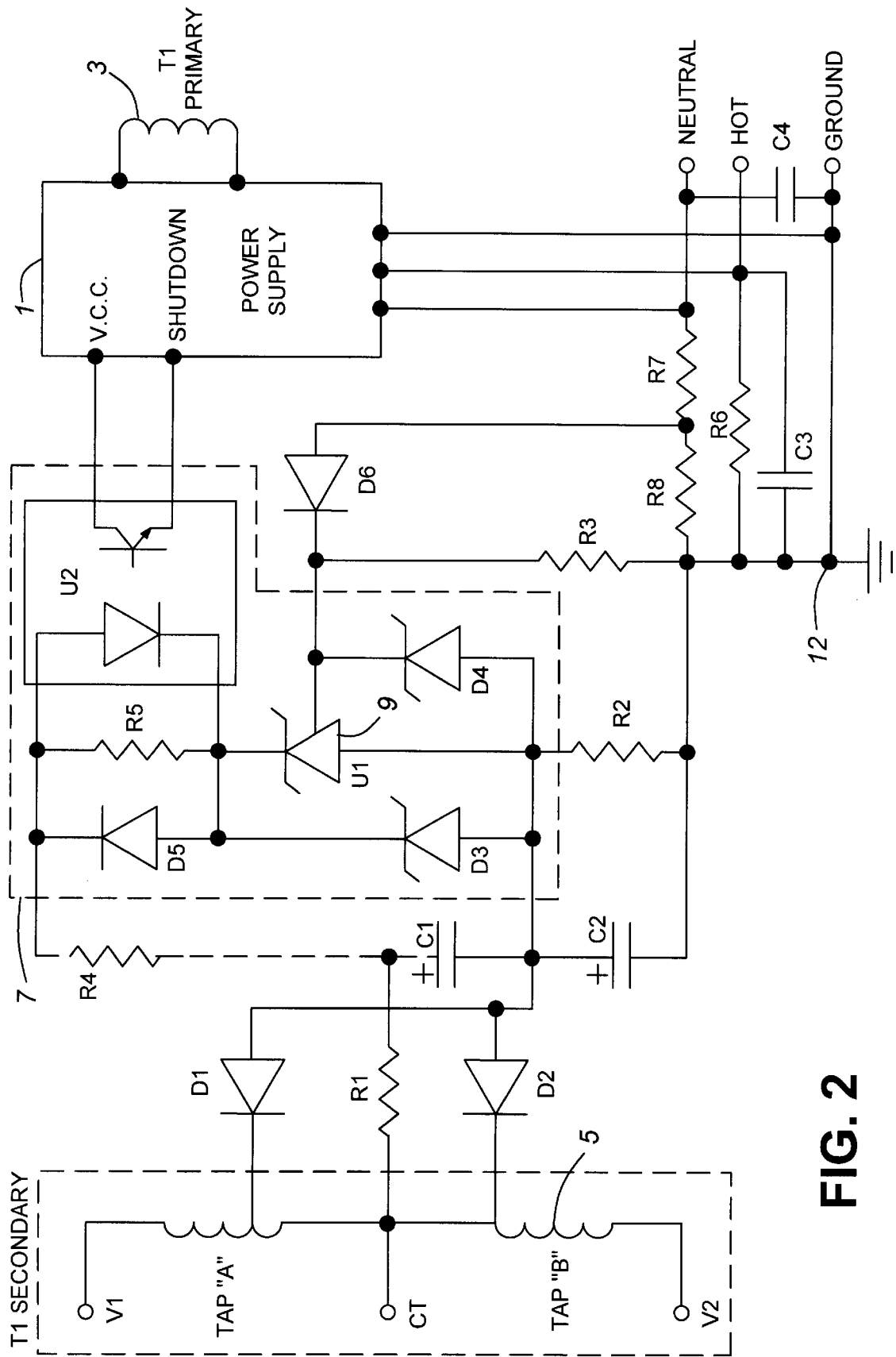
FIG. 2 is a schematic diagram which illustrates another embodiment of the invention.

Turning now to FIG. 2, the A.C. mains input supply to the power supply 1 is shown as a neutral conductor and a hot conductor (across which 120 V.A.C. is typically provided), and an external ground conductor. The external ground conductor is to be connected to a ground connection point 12, which is typically connected to a chassis or frame.

In accordance with an embodiment of the invention, an impedance such as resistor R6 is connected between the hot conductor and the ground connection point 12. Another impedance such as formed of a pair of series resistors R7 and R8 is connected between the ground connection point 12 and the neutral conductor. As may be seen, a circuit has been created between the hot conductor and the neutral lead via impedances R6, R8 and R7, and thus a current can flow through these impedances. It is preferred that the impedance value of R6 is high, so that only a small, not dangerous current is allowed to flow. In the case that R6 is a resistor, a value of 4.7 megohms has been found to be satisfactory.

In the case in which the external ground is connected to the ground connection point 12, the current flow from the hot conductor to the neutral conductor will be via impedance R6, the ground connection point 12, the ground conductor to its external connection to the neutral conductor, substantially bypassing the part of the circuit constituted by impedances R8 and R7.

However, in the case in which the ground conductor has broken, or is otherwise not connected to the ground connection point, current passes from the hot conductor through the impedances R6, R8 and R7 to the neutral conductor. This current establishes a voltage drop across impedance R8.

This voltage drop is rectified by diode D6 which has its anode connected to the junction of impedance R8 and R7. Resistor R3 is connected in series with diode D6 to the other terminal of impedance R8, so that rectified current, limited by resistor R3, can pass through the diode. That other terminal is also connected to the ground connection point 12, which is the ground point described with reference to the ground fault detector described earlier, i.e. at the junction of resistor R2 and capacitor C2.

The cathode of diode D6 is coupled to the control input of shunt regulator U1.

Capacitor C3 is preferred to be connected in parallel with resistor R6, and capacitor C4 is preferred to be connected between the neutral conductor and the ground connection point. These capacitors are used to suppress electromagnetic interference caused by common mode currents.

Thus when the external ground is not connected to the ground connection point 12, current passes through impedance R8 as described above, the resulting voltage across impedance R8 is rectified and is applied to the control input of shunt regulator U1, which causes the power supply to shut down in a similar manner as the ground fault embodiment described earlier.

In the case in which there is excessive voltage between the neutral and ground, a current is passed through the series impedances R8 and R7. Impedances R8 and R7 form a voltage divider. Thus a portion of the excessive voltage determined by the ratio of one impedance (e.g. R8) divided by the total impedance (R8+R7), is rectified by the same diode D6 as rectifies the voltage resulting from the absence of the ground conductor. This rectified voltage is applied to the control input of shunt regulator U1, which causes the power supply to shut down in a similar manner as the ground fault embodiment described earlier.

The value of the excessive voltage which triggers power supply shutdown can be controlled by the ratio of the impedances R8 and (R7+R8). In a successful embodiment, in which the input voltage across the hot and neutral conductors was 120 volts A.C., all of the impedances were resistors; resistor R6 was 4.7 Megohms, resistor R8 was 470 Kohms, resistor R7 was 4.7 Megohms, and resistor R3 was 2.2 Kohms.

Thus nearly all of the same components which detect the absence of proper connection of the external ground conductor to the ground connection point are used to detect excessive voltage between the neutral and ground conductors. The circuit is simple, inexpensive and effective.

Further, the circuit is usefully coupled to the same power supply shut-off control circuit which is used for the ground fault detector embodiment described earlier in this patent application, wherein the same control input of the shunt regulator receives a shut-off control signal from the ground fault detector and from the ground connection absence detector and excessive neutral to ground voltage detector.

A combined safety circuit for all embodiments may be thereby provided, saving costs.

A person skilled in the art understanding the above description may now consider other embodiments using the principles described above. All such embodiments which are within the spirit and scope of the claims appended hereto are considered to be part of the present invention.

I claim:

1. A method of detecting absence of connection of an external ground to a ground connection point for connection to a ground conductor associated with an AC supply circuit of a power supply, wherein the AC supply circuit has hot, neutral, and ground conductors, and wherein the neutral conductor is externally connected to ground, comprising:
   (a) passing a predetermined current between the hot conductor and the neutral conductor via the ground connection point,
   (b) detecting the passage of the current, and
   (c) shutting down operation of the power supply upon detection of the current.

2. A method as defined in claim 1 including bypassing at least an effective portion of the current from the ground connection point to said ground conductor on connection of the ground connection point to said ground conductor, thereby disabling said passage of current from the hot conductor to the neutral conductor.

3. A method as defined in claim 1, including, in the detecting step, passing the current through a first impedance, rectifying a voltage caused by passage of the current through the first impedance, and applying the rectified voltage to a control input of a switch; and shutting down operation of the power supply as a result of operation of the switch.

4. A method as defined in claim 3 including passing the current from the hot conductor to the ground connection point via a second impedance, and in which the first impedance is in a circuit between the ground connection point and the neutral conductor.

5. A method as defined in claim 4 in which at least one of the impedances is a resistor.

6. A method as defined in claim 4 in which both of the impedances are resistors.

7. A method as defined in claim 6 in which the rectifying step is performed by a diode connected in series with a current limiting resistor across the first impedance, and in which the rectified voltage is applied from a junction between the diode and the current limiting resistor.

8. A method as defined in claim 7 including bypassing at least an effective portion of the current from the ground connection point to external ground on connection of the ground connection point to external ground, thereby disabling said detection of passage of the current.

9. A method as defined in claim 1 and the step of detecting at least a fraction of an excessive voltage difference between the ground connection point and the neutral conductor comprising passing current caused by the excessive voltage between the ground connection point and the neutral conductor through an impedance, detecting voltage appearing across at least part of the impedance resulting from the excessive voltage, and shutting down operation of the power supply as a result of detecting said voltage.

10. A method as defined in claim 9 in which the impedance is comprised of a first part impedance in series with a second part impedance forming a voltage divider connected between the ground connection point and the neutral terminal, and rectifying voltage appearing across one of the first and second part impedances resulting from the excessive voltage.

11. A method as defined in claim 10 in which each of the first and second part impedances are comprised of resistors, and in which the rectifying step is performed by a diode connected in series with a current limiting resistor across the first part impedance, and in which the rectified voltage is applied from a junction between the diode and the current limiting resistor.

12. A method as defined in claim 4, in which the circuit between the ground connection point and the neutral conductor is comprised of a voltage divider comprising a pair of series connected impedances, and the step of rectifying the voltage being the step of rectifying a voltage appearing across one of the series connected impedances which voltage is caused by at least one of (a) excessive voltage difference appearing between the ground connection point and the neutral conductor, and (b) passage of said current.

13. A method as defined in claim 12 in which all of said impedances are resistors.

14. A method as defined in claim 12 in which the rectifying step is performed by a diode connected in series with a current limiting resistor across one of the series connected impedances, and in which the rectified voltage is applied from a junction between the diode and the current limiting resistor.

15. An interrupt circuit for a power supply having neutral, ground and hot input supply conductors, said ground conductor being connected to a ground connection point, comprising:

(a) a first impedance connected between the neutral conductor and said ground connection point, (b) a second impedance connected between the hot conductor and said ground connection point, (c) a rectification circuit connected across a part of the first impedance, and (d) a power supply shut-off circuit for receiving a rectified voltage provided by the rectification circuit in the presence of a predetermined current carried by the first impedance, said current being greater than said predetermined current, and for shutting down operation of the power supply in response thereto.

16. A circuit as defined in claim 15, in which the first impedance is comprised of at least a pair of series connected impedances, and in which the rectification circuit is connected across one of the pair of series connected impedances.

17. A circuit as defined in claim 16, in which the rectification circuit is comprised of a diode connected in series with a current limiting resistor across said one of the pair of series connected impedances.

18. A circuit as defined in claim 17 in which all of the impedances are resistors.

19. A circuit as defined in claim 17 in which the power supply shut-off circuit is comprised of a switch having a control input, a circuit for applying the rectified voltage to the control input, the switch being coupled to the power supply for causing the power supply to shut down in the presence of a predetermined level of said rectified voltage.

* * * * *